US008934679B2

(12) United States Patent
Jeon et al.

(10) Patent No.: US 8,934,679 B2
(45) Date of Patent: Jan. 13, 2015

(54) APPARATUS FOR REAL-TIME FACE RECOGNITION

(71) Applicant: Sungkyunkwan University Research & Business Foundation, Suwon-si (KR)

(72) Inventors: Jae Wook Jeon, Seoul (KR); Ji Hyo Song, Suwon-si (KR); Jun Hee Jung, Incheon (KR); Dong Gyun Kim, Seoul (KR); Tuong Thuy Nguyen, Suwon-si (KR); Sang Jun Lee, Anyang-si (KR); Dai Jin Kim, Pohang-si (KR); Mun Sang Kim, Seoul (KR)

(73) Assignee: Sungkyunkwan University Research & Business Foundation, Suwon-si (KR)

( * ) Notice: Subject to any disclaimer, the term of this patent is extended or adjusted under 35 U.S.C. 154(b) by 41 days.

(21) Appl. No.: 13/741,030

(22) Filed: Jan. 14, 2013

(65) Prior Publication Data

US 2013/0202159 A1 Aug. 8, 2013

(30) Foreign Application Priority Data

Jan. 17, 2012 (KR) .......................... 10-2012-0005223

(51) Int. Cl.
| | | |
|---|---|---|
| *G06K 9/46* | (2006.01) | |
| *G06K 9/62* | (2006.01) | |
| *G06K 9/00* | (2006.01) | |

(52) U.S. Cl.
CPC ................................. *G06K 9/00268* (2013.01)
USPC .......................................... 382/118; 382/304

(58) Field of Classification Search
None
See application file for complete search history.

(56) References Cited

FOREIGN PATENT DOCUMENTS

| JP | 2010-218551 A | 9/2010 |
|---|---|---|
| KR | 10-2006-0054540 A | 5/2006 |
| KR | 10-2011-0051714 A | 5/2011 |

OTHER PUBLICATIONS

Timo Ahonen et al., "Face Description with Local Binary Patterns: Application to Face Recognition", IEEE Transactions on Pattern Analysis and Machine Intelligence, vol. 28, No. 12, Dec. 2006, pp. 2037-2041.*
Timo Ahonen et al., "Face Recognition with Local Binary Patterns", T. Pajdla and J. Matas (Eds.): ECCV 2004, LNCS 3021, pp. 469-481, 2004.*
Gang Bai et al, "Facial Expression Recognition Based on Fusion Features of LBP and Gabor with LDA", IEEE publication, copyright 2009, 5 pages total.*

(Continued)

*Primary Examiner* — Brian P Werner
(74) *Attorney, Agent, or Firm* — NSIP Law

(57) ABSTRACT

Disclosed herein is a real-time face recognition apparatus and method. A real-time face recognition apparatus includes a face detection unit for detecting a face image by obtaining image coordinates of a face from an input image. An eye detection unit obtains image coordinates of both eyes in the face image. A facial feature extraction unit generates feature histogram data based on parallel processing from the face image. A DB unit stores predetermined comparative feature histograms. A histogram matching unit compares the histogram data generated by the facial feature extraction unit with the comparative feature histograms, and then outputting similarities of face images. The face recognition apparatus may be implemented as internal hardware in which a VGA camera and an exclusive chip interface with each other, thus remarkably reducing a system size and installation cost, and performing face recognition in real time without requiring additional equipment.

9 Claims, 6 Drawing Sheets

(56) References Cited

OTHER PUBLICATIONS

Yong-Guk Kim et al., "A Fully Automatic System Recognizing Human Facial Expressions", M.Gh. Negoita et al. (Eds.): KES 2004, LNAI 3215, pp. 203-209, 2004.*

Wenchao Zhang et al., "Local Gabor Binary Pattern Histogram Sequence (LGBPHS): A Novel Non-Statistical Model for Face Representation and Recognition", Proceedings of the Tenth IEEE International Conference on Computer Vision (ICCV'05) 1550-5499/05 $20.00, copyright 2005, 6 pages total.*

Shufu Xie et al., "Fusing Local Patterns of Gabor Magnitude and Phase for Face Recognition", IEEE Transactions on Image Processing, vol. 19, No. 5, May 2010, pp. 1349-1361.*

Qingshan Yang et al, "Parallel Face Recognition Approach Based on LGBPHS with Homogeneous PC Cluster", Journal of Information & Computational Science 7: 3 (2010) 637-648, Copyright 2010.*

* cited by examiner

APPARATUS FOR REAL-TIME FACE RECOGNITION

CROSS-REFERENCE TO RELATED APPLICATION

This application claims the benefit under 35 U.S.C. §119(a) of Korean Patent Application No. 10-2012-0005223, filed on Jan. 17, 2012, in the Korean Intellectual Property Office, the entire disclosure of which is incorporated herein by reference for all purposes.

BACKGROUND

1. Field

The present invention relates, in general, to an apparatus for detecting and recognizing a face in an image. More particularly, the present invention relates to an apparatus that recognizes a face using a non-statistical method, and especially recognizes the face of a human being in real time using only an embedded device for performing parallel processing.

2. Description of Related Art

In image processing and analysis, the face of a person is an important feature in visual discrimination and identification. From the early 1990s, analytical technologies for the recognition of a face and the interpretation of facial expressions have been widely developed. Recently, Moving Picture Experts Group-7 (MPEG-7) face descriptors have been proposed so as to search a sequence of images for a face and identify the corresponding person. Unlike conventional face recognition algorithms, the principal function of the face descriptors is to search for face images identical to an image of a person who has been inquired about as promptly and effectively as possible.

Face recognition technology denotes technology for identifying one or more persons using a given face database (DB) for faces of one or more persons present in a still image or a moving image.

Generally, face recognition is implemented using software in a typical sequential system due to the complexity of the performance thereof. Such a method encounters difficulties when a real-time operation is performed in the field of face recognition that requires very large data throughput. Further, the method is problematic in that, since a Personal Computer (PC) is used, system cost becomes high and a system size increases.

SUMMARY

Accordingly, the present invention has been made keeping in mind the above problems occurring in the prior art, and an object of the present invention is to provide a real-time face recognition apparatus, which recognizes the face of a person by detecting his or her face in an image.

Another object of the present invention is to provide a real-time face recognition apparatus, which recognizes the face of a person using a non-statistical method.

A further object of the present invention is to provide a real-time face recognition apparatus, which recognizes the face of a person in real time using a small-sized embedded system capable of performing parallel-processing.

Objects of the present invention are not limited to the above-described objects, and other objects of the present invention will be more clearly understood from the following detailed description.

In order to accomplish the above objects, the present invention provides a real-time face recognition apparatus including a face detection unit for detecting a face image by obtaining image coordinates of a face from an input image, an eye detection unit for obtaining image coordinates of both eyes in the face image detected by the face detection unit, a facial feature extraction unit for generating feature histogram data based on parallel processing from the face image detected by the face detection unit, a database (DB) unit for storing previously generated comparative feature histograms, and a histogram matching unit for comparing the histogram data generated by the facial feature extraction unit with the comparative feature histograms stored in the DB unit, and then outputting similarities of the face image.

Preferably, the facial feature extraction unit may include a face normalization unit for downscaling the face image based on the coordinates of both eyes obtained by the eye detection unit, a convolution filtering operation unit for converting the face image downscaled by the face normalization unit into a Gabor Magnitude Picture (GMP) by performing convolution filtering between the downscaled face image and Gabor filters, a Multi-resolution Local Binary Pattern (MLBP) operation unit for converting the GMP into a Local Gabor Binary Pattern (LGBP) map by simultaneously applying two MLBPs to the GMP, and a histogram generation unit for dividing the LGBP map into a plurality of regions having an equal size and generating a histogram for a part of the plurality of regions.

Preferably, the Gabor filters may include Gabor filter pairs stored in Read Only Memory (ROM), each Gabor filter pair having a real part and an imaginary part.

Preferably, the convolution filtering operation unit may have a structure capable of accessing a plurality of pieces of image data using a window, wherein the window has a width of one pixel and a length identical to that of the Gabor filter pairs.

Preferably, the histogram generation unit may generate the histogram by sequentially mapping uniform LGBPs to numbers from 1 and mapping LGBPs other than the uniform LGBPs to 0 in the LGBP map converted by the MLBP operation unit.

Preferably, the real-time face recognition apparatus may further include a recognition result output unit for outputting identification information of a comparative feature histogram having a lowest similarity output from the histogram matching unit.

Further, in order to accomplish the above objects, the present invention provides a real-time face recognition apparatus including a face template unit for causing a face to be located therein so that eyes are placed at a reference location, a facial feature extraction unit for generating an image of the face located in the face template unit, and generating feature histogram data based on parallel processing from the generated face image, a database (DB) unit for storing predetermined comparative feature histograms, and a histogram matching unit for comparing the histogram data generated by the facial feature extraction unit with the comparative feature histograms stored in the DB unit, and then outputting similarities of the face image.

Preferably, the facial feature extraction unit may include a face normalization unit for downscaling the face image based on coordinates of both eyes obtained by the face template unit, a convolution filtering operation unit for converting the face image downscaled by the face normalization unit into a Gabor Magnitude Picture (GMP) by performing convolution filtering between the downscaled face image and Gabor filters, a Multi-resolution Local Binary Pattern (MLBP) operation unit for converting the GMP into a Local Gabor Binary Pattern (LGBP) map by simultaneously applying two MLBPs to the GMP, and a histogram generation unit for dividing the LGBP map into a plurality of regions having an equal size and generating a histogram for a part of the plurality of regions.

Preferably, the convolution filtering operation unit may have a structure capable of accessing a plurality of pieces of image data using a window, wherein the window has a width of one pixel and a length identical to that of Gabor filter pairs.

Preferably, the histogram generation unit may generate the histogram by sequentially mapping uniform LGBPs to numbers from 1 and mapping LGBPs other than the uniform LGBPs to 0 in the LGBP map converted by the MLBP operation unit.

Preferably, the real-time face recognition apparatus may further include a recognition result output unit for outputting identification information of a comparative feature histogram having a lowest similarity output from the histogram matching unit.

DETAILED DESCRIPTION

Figure 1:
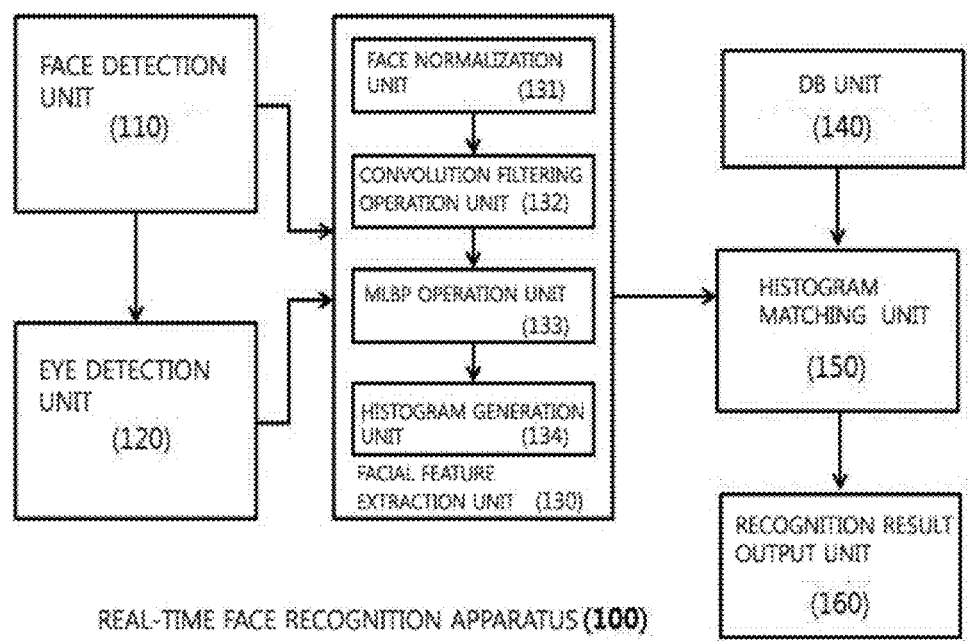
FIG. 1 is a block diagram showing the schematic configuration of a real-time face recognition apparatus according to an embodiment of the present invention.

The present invention may be modified in various manners and may have various embodiments, so that specific embodiments are intended to be illustrated in the drawings and described in detail in the present specification. However, it should be understood that the present invention is not intended to limit the specific embodiments and the present invention includes all changes, equivalents or modifications included in the spirit and scope of the present invention.

The terms, such as "first," "second," "A," and "B," may be used to describe various components, but those components are not limited by the terms, and the terms are merely used to distinguish one component from other components. For example, a first component may be designated as a second component and a second component may be designated as a first component in the similar manner, without departing from the scope based on the concept of the present invention. The term "and/or" includes a combination of a plurality of related items or any of a plurality of related items.

It should be understood that, in the terms used in the present specification, a singular expression includes a plural expression unless a description to the contrary is specifically pointed out in context, and the terms such as "include" are merely intended to indicate that features, numbers, steps, operations, components, parts, or combinations thereof are present and are not intended to exclude a possibility that one or more other features, numbers, steps, operations, components, parts, or combinations thereof will be present or added.

Hereinafter, a real-time face recognition apparatus according to the present invention will be described in detail with reference to the attached drawings.

Prior to a detailed description of the drawings, it should be clarified that division of components in the present specification is performed merely based on main functions performed by the respective components. That is, two or more components which will be described later may be integrated into a single component or, alternatively, a single component may be provided to be divided into two or more components depending on subdivided functions. Further, it is apparent that each of the components, which will be described later, may additionally perform some or all of functions performed by other components, in addition to main functions performed thereby, and some of the main functions performed by the respective components may be shared with other components and may be performed. Therefore, the presence or non-presence of individual components, which are described in the present specification, should be functionally interpreted. For this reason, it is clarified that the configuration of the components of a real-time face recognition apparatus 100 according to the present invention may be different from those of FIG. 1 or 2 within the range of achievement of the objects of the present invention.

FIG. 1 is a block diagram showing the schematic configuration of a real-time face recognition apparatus 100 according to an embodiment of the present invention.

The real-time face recognition apparatus 100 according to an embodiment of the present invention includes a face detection unit 110, an eye detection unit 120, a facial feature extraction unit 130, a database (DB) unit 140, and a histogram matching unit 150. The face detection unit 110 detects a face image by obtaining image coordinates of a face from an input image. The eye detection unit 120 obtains image coordinates of both eyes from the face image detected by the face detection unit. The facial feature extraction unit 130 generates feature histogram data based on parallel processing from the face image detected by the face detection unit. The DB unit 140 stores comparative feature histograms that are predetermined. The histogram matching unit 150 compares the histogram data generated by the facial feature extraction unit with the comparative feature histograms stored in the DB unit 140, and then outputs the similarities of the face image.

In addition to the above configuration, the face recognition apparatus basically includes a digital camera for acquiring images from the outside of the apparatus, and memory (frame buffer memory) for image processing of the images acquired by the camera.

The face detection unit 110 detects the coordinates of the face image in the input image or images stored in the frame buffer memory. Face detection is performed in such a way as to generate a window for all places within the input image, compare the generated window with a face reference image (classifier), and then determine whether the corresponding image is an image of a face depending on the confidence value of the face area of the corresponding window. A detailed description of face detection is given in a prior patent filed by the present inventor and entitled "Real-time face detection apparatus" (disclosed in Korean Patent Registration No. 10-1033098, issued as U.S. Pat. No. 8,363,983 B2).

The eye detection unit 120 is a component for detecting the coordinates of eyes of a person in a face area specified by the coordinates of the face image detected by the face detection unit 110. That is, the coordinates of both eyes are detected and then the face is recognized based on the locations of the eyes. A detailed description of eye detection is given in a prior patent filed by the present inventor and entitled "Real-time eye detection apparatus and method" (disclosed in Korean Patent Application No. 10-2011-0030955).

Meanwhile, another embodiment of the face recognition apparatus according to the present invention has a configuration in which the above-described face detection unit 110 and eye detection unit 120 are omitted. That is, in another embodiment, though a procedure for detecting the locations of a face and eyes in the image is omitted, the face of a person is placed at a preset reference location, so as to be captured as an image, and the captured image is used.

Figure 2:
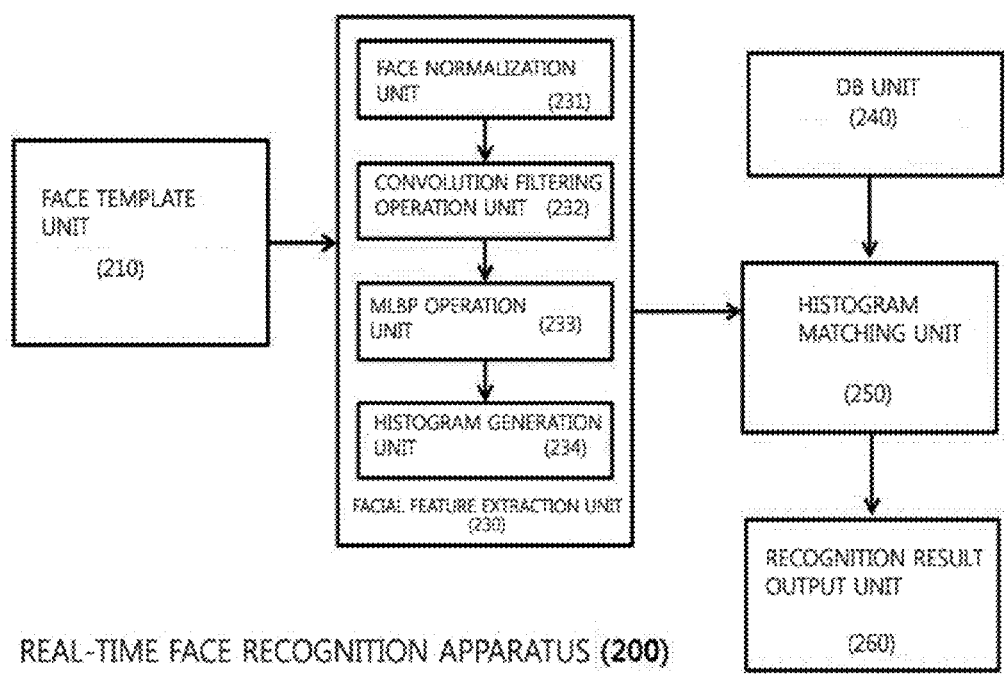
FIG. 2 is a block diagram showing the schematic configuration of a real-time face recognition apparatus according to another embodiment of the present invention.

FIG. 2 is a block diagram showing the schematic configuration of a real-time face recognition apparatus 200 according to another embodiment of the present invention.

The real-time face recognition apparatus 200 according to another embodiment of the present invention includes a face template unit 210, a facial feature extraction unit 230, a DB unit 240, and a histogram matching unit 250. The face template unit 210 is configured to locate a face therein so that eyes are placed at a reference location. The facial feature extraction unit 230 generates an image of the face located in the face template unit, and generates feature histogram data based on parallel processing from the generated face image. The DB unit 240 stores comparative feature histograms that are predetermined. The histogram matching unit 250 compares the histogram data generated by the facial feature extraction unit with the comparative feature histograms stored in the DB unit, and then outputs the similarities of the face image.

Consequently, the face template unit 210 performs the functions of the above-described face detection unit 110 and eye detection unit 120. The face detection unit 110 detects a face area in an input image, but the face template unit 210 may obtain the location of a face area and the locations of eyes considering typical facial shapes because the face of a person is placed at the reference location. The face template unit 210 may obtain the location of a face area and the locations of eyes either in a fashion of setting one's head in a hardware device, or in a way of presenting the contour of a face on a specific display screen, into which a user manually fit face images.

Figure 3:
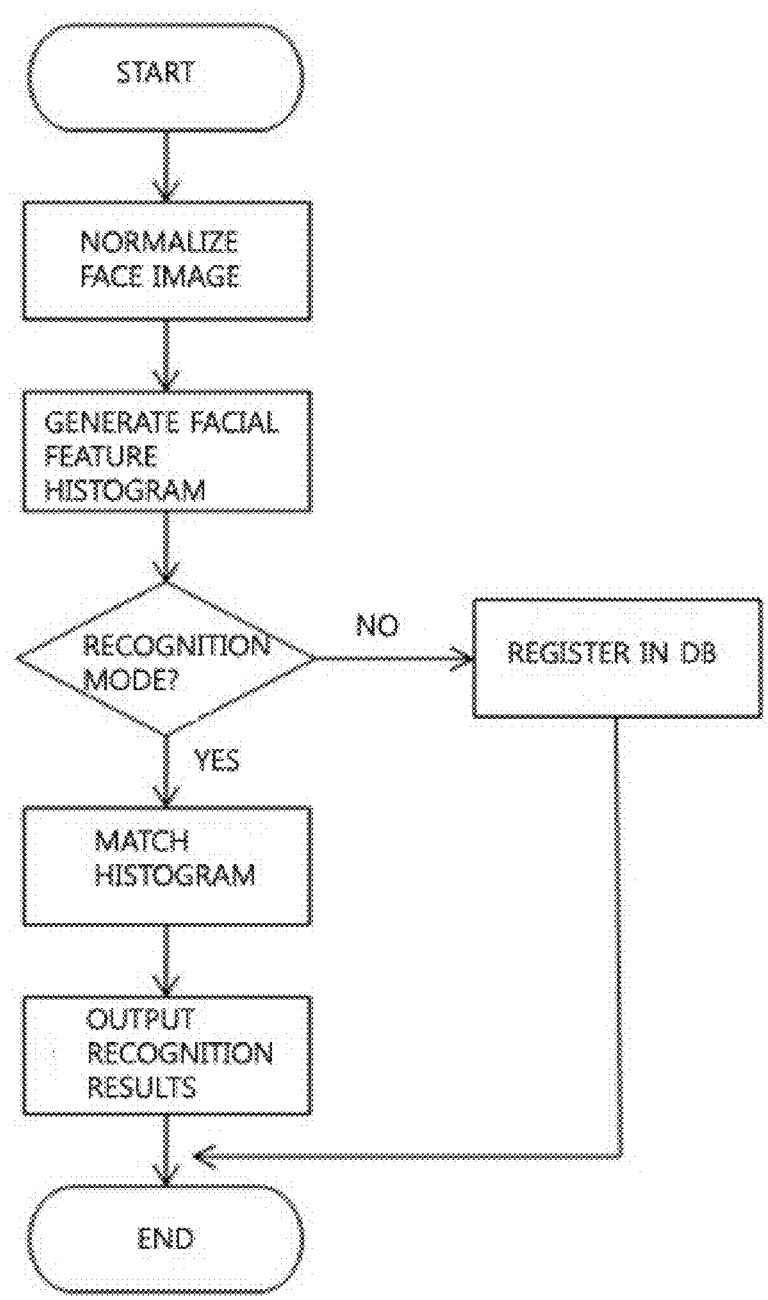
FIG. 3 is a flowchart showing the sequence of face recognition performed by the real-time face recognition apparatus according to the present invention.

FIG. 3 is a flowchart showing the sequence of face recognition performed by the real-time face recognition apparatus 100 or 200 according to the present invention. When a face recognition process is initiated, a face image normalization procedure is first performed. In face normalization, face images having various sizes are changed to images having a designated size. Facial features are extracted from the normalized face image in the form of a histogram by the facial feature extraction unit. After the procedure of determining whether it is a recognition mode or not, different operations are performed depending on whether the facial feature data is for initial registration of a face or for the recognition of a previously registered face. If the facial feature data is for the registration of facial information, an operation of registering a face in a DB is performed, whereas if the facial feature data is for face recognition, matching between previous information in the DB and the histogram is performed, and then the results of recognition based on the results of the matching are output. After the registration in the DB or after the results of recognition being output, the face recognition process will be terminated.

The facial feature extraction unit 130 or 230 includes a face normalization unit 131 or 231, a convolution filtering operation unit 132 or 232, a Multi-resolution Local Binary Pattern (MLBP) operation unit 133 or 233, and a histogram generation unit 134 or 234. The face normalization unit 131 or 132 downscales a face image based on the coordinates of both eyes obtained by the eye detection unit. The convolution filtering operation unit 132 or 232 converts the face image downscaled by the face normalization unit into a Gabor Magnitude Picture (GMP) by performing convolution filtering the downscaled face image with Gabor filters. The MLBP operation unit 133 or 233 converts the GMP into a Local Gabor Binary Pattern (LGBP) map by simultaneously applying two MLBPs to the GMP. The histogram generation unit 134 or 234 divides the LGBP map into a plurality of regions having the same size, and generates a histogram for a part of the regions.

In an embodiment in which the eye detection unit 120 is not present, the face normalization unit 231 downscales the face image based on the coordinates of both eyes obtained by the face template unit 210. Since the location of the face area and the locations of eyes can be detected using the face template unit 210, subsequent steps are performed based on the detected locations of the face area and the eyes.

The face normalization unit 131 or 231 is a component for standardizing the sizes of the faces so as to be uniformly processed in the real-time face recognition apparatus according to the present invention because the sizes of the faces in input images may differ.

The Gabor filters include Gabor filter pairs stored in Read Only Memory (ROM), each Gabor filter pair having a real part and an imaginary part.

The convolution filtering operation unit 132 or 232 has a structure capable of accessing a plurality of pieces of image data using a window, wherein the window preferably has a width of one pixel and a length identical to that of the Gabor filter pairs.

The histogram generation unit 134 or 234 generates a histogram by sequentially mapping uniform LGBPs to numbers from 1 and by mapping LGBPs other than the uniform LGBPs to 0 in the LGBP map converted by the MLBP operation unit 133 or 233.

The face recognition apparatus of the present invention was manufactured in the form of an embedded chipset and experiments on the chipset were conducted in a laboratory. Below, a description will be made based on examples used in the experiments.

In the experiments, the face normalization unit 131 or 231 received externally input image coordinates of both eyes, and then, with considering a ratio of the size defined by the externally input image coordinates to the size of a predefined template, generated a normalized face image having a width of 40 pixels and a length of 48 pixels. A two-dimensional (2D) convolution operation between the normalized face image and the Gabor filter pairs was then performed by the convolution filtering operation unit 132 or 232.

Figure 4:
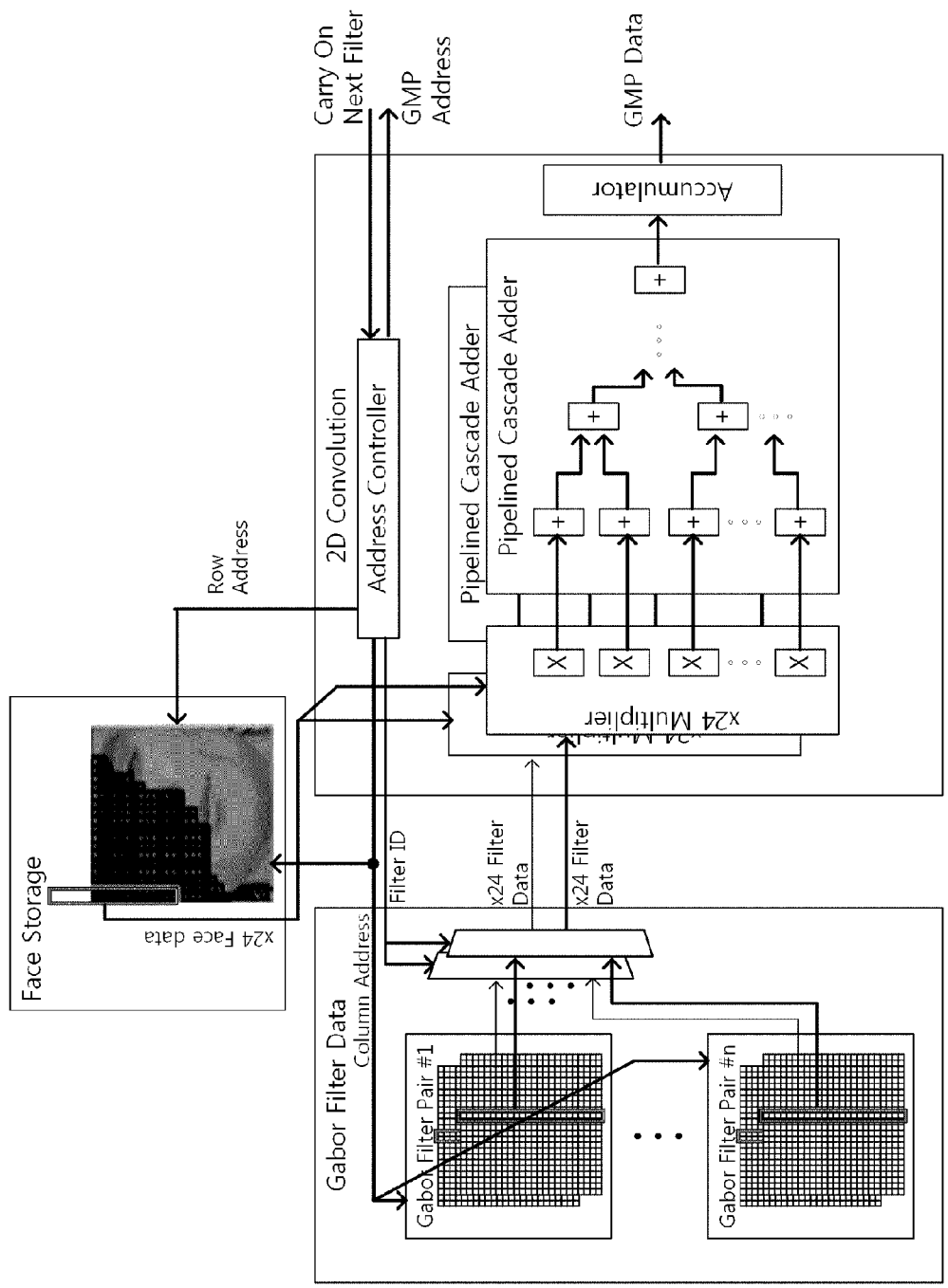
FIG. 4 is a configuration diagram showing the schematic structure of a convolution filtering operation unit.

FIG. 4 is a configuration diagram showing the schematic structure of the convolution filtering operation unit 132 or 232.

The convolution filtering operation unit 132 or 232 performs a 2D convolution operation between Gabor filter pairs, each having a width of 20 pixels and a length of 24 pixels, and a normalized face image. In order to accelerate the operation, the convolution filtering operation unit has a structure in which a window having a width of one pixel and a length of 24 pixels is set, thus simultaneously accessing a plurality of pieces of data. As a result, the effect of decreasing the complexity of the 2D convolution operation to that of a one-dimensional (1D) convolution operation can be obtained. A GMP, that is, an output of the convolution filtering operation unit 132 or 232, has a width of 40 pixels and a length of 48 pixels.

Figure 5:
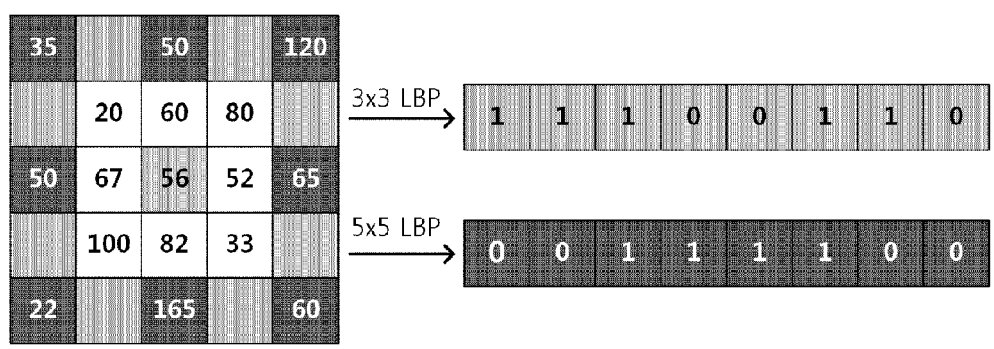
FIG. 5 is a diagram showing an example of an MLBP operation.

FIG. 5 illustrates an example of an MLBP operation.

The MLBP operation unit 133 or 233 simultaneously performs two types of LBP operations, such as for 3×3 and 5×5

LBPs, based on a center pixel by using a GMP. As a result, an LGBP map can be obtained. Generally, among pieces of LGBP data, each piece of data, in which the number of transitions from 0 to 1 or from 1 to 0 occurring in the piece of data is equal to or less than 2, is called Uniform LGBP data (hereinafter referred to as "ULGBP").

Figure 6:
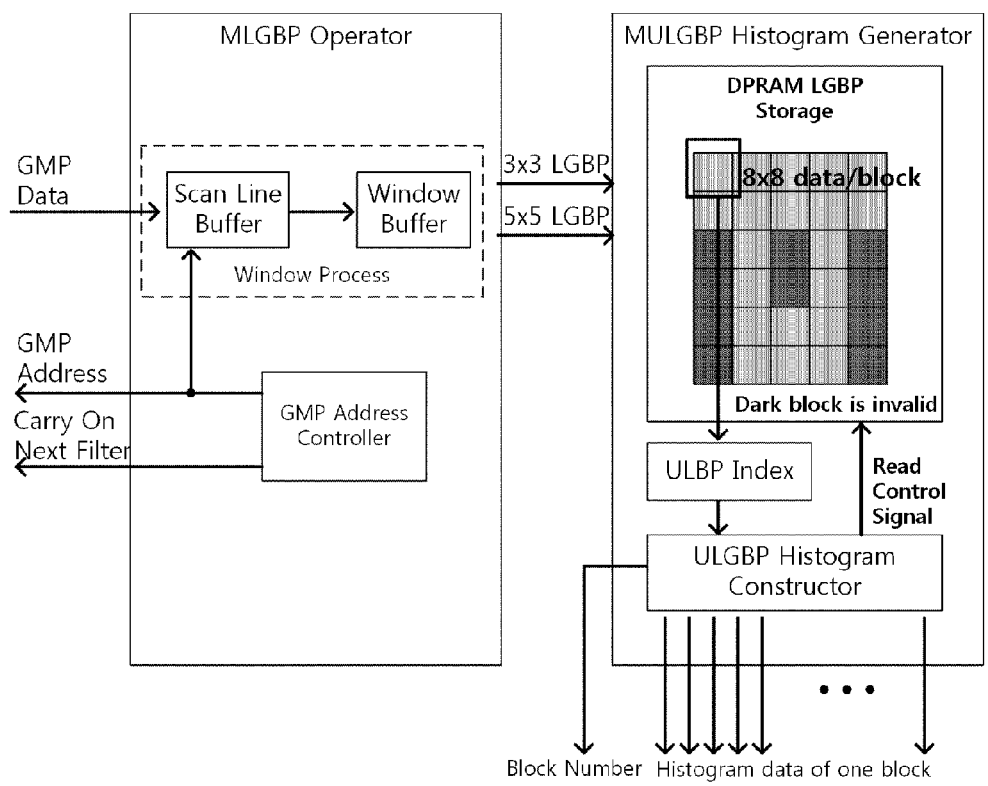
FIG. 6 is a configuration diagram showing examples of a structure ranging from an MLBP operation unit to a histogram generation unit and a data flow thereof.

FIG. 6 is a configuration diagram showing examples of a structure ranging from the MLBP operation unit 133 or 233 to the histogram generation unit 134 or 234 and a data flow thereof.

The histogram generation unit 134 or 234 generates a histogram having pieces of data from 0 to 58 such that, among 8-bit LGBP data, 58 ULGBPs exist and are mapped to numbers from 1 to 58, and the remaining LGBPs are mapped to 0. The histogram generation unit 134 or 234 divides the LGBP map into 30 equal regions, and generates a histogram for 20 regions of the 30 equal regions.

The DB unit 140 or 240 includes feature storage in which pieces of comparative feature histogram data are stored together with identification (ID) numbers, and temporary feature storage in which pieces of data to be compared with the data stored in the feature storage (data generated by the histogram generation unit) are stored. The histogram data, repeatedly appearing 20 times in the histogram generation unit, is recorded in the feature storage and the temporary feature storage depending on a data storage mode and a comparison mode.

The histogram matching unit 150 or 250 determines similarities between two pieces of feature data stored in the feature storage and the temporary feature storage. Such similarities become lower as a difference between the two pieces of feature data becomes smaller and, as a result, the ID of feature data having the lowest similarity is returned. The real-time face detection apparatus according to the present invention may further include a recognition result output unit 160 or 260 for outputting the identification information of a comparative feature histogram which has the lowest similarity output from the histogram matching unit.

As described above, the real-time face recognition apparatus according to the present invention enables the implementation of an apparatus for automatically obtaining image coordinates of a face and image coordinates of both eyes from an image input from a camera, and outputting the results of the recognition of the face in real time. Further, a simplified apparatus may be configured in which a face detection unit and an eye detection unit are omitted and a user aligns his or her face with a preset template on a screen. The face recognition apparatus configured in this way may be implemented as internal hardware in which a Video Graphics Array (VGA) camera and an exclusive chip interface with each other, thus remarkably reducing a system size and installation cost, and performing face recognition in real time without requiring additional equipment.

The effects of the present invention are not limited by the above description, and other effects that are not described here may be clearly understood by those skilled in the art from the above disclosure.

The above embodiments and drawings attached to the present specification are merely intended to clearly describe part of the technical spirit included in the present invention, and it is apparent that all modifications and detailed embodiments that can be easily derived by those skilled in the art within the scope of the technical spirit included in the specification and the drawings of the present invention are included in the scope of the invention.

What is claimed is:

1. A real-time face recognition apparatus comprising:
   a face detector configured to detect a face image by obtaining image coordinates of a face from an input image;
   a facial feature extractor configured to generate feature histogram data based on parallel processing from the face image detected by the face detector, wherein the facial feature extractor comprises a convolution filtering operation processor configured to access pieces of image data from the face image using a window, wherein the window has a width of one pixel and a length identical to that of Gabor filter pairs used to filter the face image;
   a database (DB) configured to store predetermined comparative feature histograms; and
   a histogram matcher configured to compare the histogram data generated by the facial feature extractor with the comparative feature histograms stored in the DB, and then output similarities of the face image.

2. The real-time face recognition apparatus of claim 1, wherein the facial feature extractor comprises:
   an eye detector configured to obtain image coordinates of both eyes in the face image detected by the face detector,
   a face normalizer configured to downscale the face image based on the coordinates of both eyes obtained by the eye detector,
   wherein the convolution filtering operation processor is configured to convert the face image downscaled by the face normalizer into a Gabor Magnitude Picture (GMP) by performing convolution filtering between the downscaled face image and Gabor filters,
   a Multi-resolution Local Binary Pattern (MLBP) operation processor configured to convert the GMP into a Local Gabor Binary Pattern (LGBP) map by simultaneously applying two MLBPs to the GMP, and
   a histogram generator configured to divide the LGBP map into a plurality of regions having an equal size and generating a histogram for a part of the plurality of regions.

3. The real-time face recognition apparatus of claim 2, wherein the Gabor filters include Gabor filter pairs stored in Read Only Memory (ROM), each Gabor filter pair having a real part and an imaginary part.

4. The real-time face recognition apparatus of claim 2, wherein the histogram generator generates the histogram by sequentially mapping uniform LGBPs to numbers from 1 and mapping LGBPs other than the uniform LGBPs to 0 in the LGBP map converted by the MLBP operation processor.

5. The real-time face recognition apparatus of claim 1, further comprising a recognition result output processor configured to output identification information of a comparative feature histogram having a lowest similarity output from the histogram matcher.

6. A real-time face recognition apparatus comprising:
   a face template processor configured to cause a face to be located therein so that eyes are placed at a reference location;
   a facial feature extractor configured to generate an image of the face located in the face template processor, and generate feature histogram data based on parallel processing from the generated face image wherein the facial feature extractor comprises a convolution filtering operation processor configured to access pieces of image data using a window, wherein the window has a width of one pixel and a length identical to that of Gabor filter airs used to filter the face image;

a database (DB) configured to store predetermined comparative feature histograms; and a histogram matcher configured to compare the histogram data generated by the facial feature extractor with the comparative feature histograms stored in the DB, and then output similarities of the face image.

7. The real-time face recognition apparatus of claim 6, wherein the facial feature extractor comprises:

a face normalizer configured to downscale the face image based on coordinates of both eyes obtained by the face template processor, wherein the convolution filtering operation processor is configured to convert the face image downscaled by the face normalizer into a Gabor Magnitude Picture (GMP) by performing convolution filtering between the downscaled face image and Gabor filters, a Multi-resolution Local Binary Pattern (MLBP) operation processor configured to convert the GMP into a Local Gabor Binary Pattern (LGBP) map by simultaneously applying two MLBPs to the GMP, and a histogram generator configured to divide the LGBP map into a plurality of regions having an equal size and generate a histogram for a part of the plurality of regions.

8. The real-time face recognition apparatus of claim 7, wherein the histogram generator generates the histogram by sequentially mapping uniform LGBPs to numbers from 1 and mapping LGBPs other than the uniform LGBPs to 0 in the LGBP map converted by the MLBP operation processor.

9. The real-time face recognition apparatus of claim 6, further comprising a recognition result output processor configured outputting identification information of a comparative feature histogram having a lowest similarity output from the histogram matcher.

* * * * *